3,542,810
Patented Nov. 24, 1970

3,542,810
5-ACETAL-2-NORBORNENE COMPOUNDS
Robert Lee Roudabush and Darrell Dean Lidel, Rochester, N.Y., assignors to Eastman Kodak Company, Rochester, N.Y., a corporation of New Jersey
No Drawing. Filed Sept. 5, 1968, Ser. No. 757,747
Int. Cl. C07d 13/04, 15/04, 17/00
U.S. Cl. 260—338                                                       6 Claims

ABSTRACT OF THE DISCLOSURE 5-acetal-2-norbornenes such as 5-[2-(1,3-dioxolanyl)]-6-methyl-2-norbornene are bactericidally active, and are useful as bactericidal additives to paints, plastics, photographic emulsions and the like. These compounds are synthesized from cyclopentadiene and an $\alpha,\beta$-unsaturated aldehyde by a two-step process comprising a Diels-Alder addition of the cyclopentadiene with the $\alpha,\beta$-unsaturated aldehyde, followed by reaction of the adduct product obtained with a dihydric alcohol to form the acetal.

---

This invention is concerned with novel 5-acetal-2-norbornenes which are characterized by bactericidal activity. These compounds may be represented by the general formula:

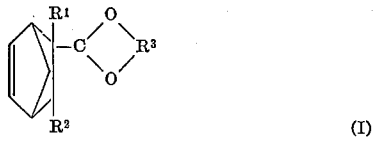

wherein $R^1$ and $R^2$ each represents hydrogen or lower alkyl and $R^3$ represents a polymethylene radical of from 2 to 4 carbons which is unsubstituted or substituted with lower alkyl or lower (alkoxyalkyl) groups.

By the term "lower alkyl" is meant an alkyl group having 1 to about 6 carbon atoms, whether branched or straight chain, such as methyl, ethyl, propyl, isopropyl, butyl, tert-butyl, pentyl, hexyl and the like. Preferred lower alkyl groups are n-alkyl groups having 1 to 3 carbon atoms inclusive.

By the term "lower alkoxyalkyl" is meant an alkoxyalkyl group having 2 to about 6 carbon atoms, inclusive, such as methoxymethyl, 2-methoxyethyl, 2-ethoxyethyl, 2-propoxyethyl, 3-propoxypropyl, 2-isopropoxypropyl and the like.

Preferred compounds within the scope of Formula I are those wherein $R^1$ is hydrogen and $R^2$ is lower alkyl, especially methyl.

The products of this invention are readily produced in two steps from easily available and inexpensive raw materials, viz, cyclopentadiene, $\alpha,\beta$-unsaturated aldehydes and dihydric alcohols.

In the first step, cyclopentadiene is reacted with an $\alpha,\beta$-unsaturated aldehyde of the formula:

$$R^2CH=CR^1CHO \qquad (II)$$

wherein $R^1$ and $R^2$ are as defined hereinbefore. Illustrative aldehydes include acrolein, methacrolein, crotonaldehyde, 2-pentenal and the like.

The reaction proceeds via the well known Diels-Alder addition to yield a 5-formyl-2-norbornene of the formula:

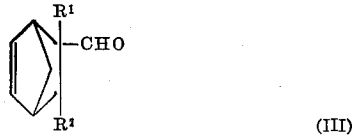

wherein $R^1$ and $R^2$ are as previously defined. The reaction conditions of the Diels-Alder reaction are not critical, although elevated temperatures such as 50–150° C. are normally employed.

The products of this invention are obtained from the formylnorbornenes III by acid-catalyzed acetalization with a dihydric alcohol such as ethylene glycol, propylene glycol, 1,3-propanediol, 1,4-butanediol, 1,2-butanediol, 2,3-butanediol, 1,3-butanediol, 3-methoxy-1,2-propanediol and the like.

Acid catalysts include organic carboxylic or sulfonic acids as well as mineral acids. Organic sulfonic acids, such as benzenesulfonic acid, p-toluenesulfonic acid and the like are preferred.

The reaction conditions for the acetalization reaction are not narrowly critical, although elevated temperatures, for example 50 to 150° C. are ordinarily necessary to achieve an acceptable reaction rate. It is also desirable to remove the water formed by the reaction as it is formed to drive the reaction to completion. This is easily effected by conducting the reaction under reflux in a solvent, such as benzene or toluene, which forms a minimum boiling azeotrope with water, and separating the water from the distillate.

The products of this invention are useful as bactericides, and are characterized by low mammalian toxicity. More particularly, they are useful as topical disinfectants or as additives to paints, photographic emulsions and the like to prevent the growth of bacteria therein.

When employed as topical disinfectants the compounds of this invention may be applied to the locus to be protected in any suitable manner, preferably as a solution, suspension or emulsion in an inert liquid vehicle. Although water can be employed, its use is not desirable because of the danger of hydrolysis of the acetal group. Preferred organic liquid vehicles include alkanols such as methanol, ethanol and the like; hydrocarbons such as pentane, hexane, cyclohexane and the like; chlorinated hydrocarbons such as carbon tetrachloride and the like; and ethers such as ethyl ether, isopropyl ether and the like. The concentration of the compound in the liquid composition is not narrowly critical, but generally is in the range of from 0.5 to 25 percent by volume.

When employed as additives, they are of particular utility in preventing bacterial attack on gelatin-containing systems. For such uses, the effective amount is generally in the range of from about 0.5 to about 5 weight percent, although higher and lower amounts can be employed if desired.

EXAMPLE 1

A mixture of 272.4 grams of 5-formyl-6-methyl-2-norbornene, 620 grams of ethylene glycol, 1000 milliliters of benzene and 5 grams of p-toluenesulfonic acid was distilled azeotropically until 32 milliliters of water had collected in the azeotrope head. After cooling, the benzene was removed under reduced pressure and the residue was extracted with water. On fractionation of the organic layer there was obtained 298.9 grams of 5-[2-(1,3-dioxolanyl)]-6-methyl-2-norbornene as a fraction boiling at 105° C. and 5 mm. Hg.

Analysis.—Calculated for $C_{11}H_{16}O_2$ (percent): C, 73.4; H, 8.9. Found (percent): C, 73.4; H, 9.1.

EXAMPLE 2

A solution of 136 grams of 5-formyl-6-methyl-2-norbornene, 76 grams of 1,3-propanediol, 1000 milliliters of xylene and 0.1 gram of p-toluenesulfonic acid was refluxed under an azeotropic head until 18 milliliters of water had collected. After cooling the reaction mixture, neutralization with calcium oxide, filtering and removing the xylene under reduced pressure, the residue was fractionated to yield 5-[1-(1,3-dioxanyl)]-6-methyl-2-norbornene, B.P. 82° C./0.8 mm.; $N_D^{25}$, 1.4880.

*Analysis.*—Calculated for $C_{12}H_{18}O_2$ (percent): C, 74.3; H, 9.3. Found (percent): C, 74.7; H, 9.7.

EXAMPLE 3

Employing procedures similar to those described in Example 2, except that 1,4-butanediol was substituted for the propanediol, there was obtained 5-[2-(1,3-dioxepanyl)]-6-methyl-2-norbornene, B.P. 94° C./0.6 mm.; $N_D^{25}$, 1.4887.

*Analysis.*—Calculated for $C_{13}H_{20}O_2$ (percent): C, 75.0; H, 9.6. Found (percent): C, 74.5; H, 9.8.

EXAMPLE 4

Employing procedures similar to those described in Example 2, except that 3-methoxy-1,2-propanediol was substituted for the 1,3-propanediol, there was obtained 5-[2-(4-methoxymethyl-1,3-dioxolanyl)] - 6 - methyl - 2 - norbornene, B.P. 60° C./80μ $N_D^{25}$, 1.4777.

*Analysis.*—Calculated for $C_{13}H_{20}O_3$ (percent): C, 69.6; H, 9.0. Found (percent): C, 69.8; H, 9.0.

EXAMPLE 5

The products of Examples 1–4 were evaluated for bactericidal activity by the following procedure:

For each compound several two fold dilutions of the compound in Brain Heart Infusion Broth in test tubes were prepared. To each tube was added on equal volume of a 24-hour diluted broth culture of the test organism to assure a bacterial inoculum of equal size. The concentrations used in the test were 1000, 250, 125, 62.5, 31.25, 15.62, 7.81, 3.90, 1.95, 0.975, and 0.487 μg./cc.

All tubes were incubated at 37° C. for 18 hours and then examined for growth, with the lowest concentration at which no growth occurred being reported in Table I below.

The test organisms were hemolytic *Staphylococcus aureus* (coagulase positive), *Escherichia coli*, *Proteus vulgaris*, *Pseudomonas aeruginosa* and *Salmonella typhimurium*.

The results of these tests are summarized in Table I.

EXAMPLE 6

These products were tested for mammalian toxicity by administration orally or intraperitoneally to groups of 10 male albino mice weighing 20–30 grams of a 10% emulsion in water, employing 1 drop per milliliter of "Tween 80" (a non-ionic surface-active agent marketed by Atlas Powder Co.) as an emulsifier. An initial dose of 2000 milligrams of compound per kilogram of body weight was administered orally, and an initial dose of 1000 mg./kg. was administered interperitoneally. After 48 hours, the mortality ratio (number dead/number dosed) was determined. If most or all of the animals died, subsequent treatments were administered by reducing the dosage level by half to a minimum of 250 mg./kg. orally and 125 mg./kg. intraperitoneally. The approximate dosage at which 50 percent of the animals survive ($ALD_{50}$) was then estimated. Where more than 50 percent of the test group survived at the maximum dosage, the $ALD_0$ is recorded as >2000 mg./kg. p.o., or >1000 mg./kg., i.p. The results of these tests are summarized in Table II.

TABLE II

| Example: | Toxicity, mg./kg. | |
|---|---|---|
| | p.o. | i.p. |
| 1 | >2,000 | 300 |
| 2 | >2,000 | 500 |
| 3 | >2,000 | 200 |
| 4 | >2,000 | 325 |

EXAMPLE 7

The products of Examples 2–4 were incorporated at a concentration of 3 grams/mole of silver halide in a high-speed silver bromo-iodide emulsion which had been panchromatically sensitized with a cyanine dye. Each emulsion was then coated on a cellulose acetate film support at a coverage of 459 milligrams of silver and 1040 milligrams of gelatin per square foot. A sample of each film coating was exposed on an Eastman 1–B sensitometer, processed for 5 minutes in a Kodak DK–50 developer, fixed, washed and dried and rated for film speed, γ, and fog. A second sample was similarly rated after incubation at 120° F. and 50% relative humidity for 1 week. The results of these tests are summarized in Table III.

TABLE III

| | Fresh test | | | After incubation | | |
|---|---|---|---|---|---|---|
| | Speed | γ | Fog | Speed | γ | Fog |
| Example: | | | | | | |
| 2 | 110 | 1.43 | 0.13 | 82 | 1.05 | 0.29 |
| 3 | 97 | 1.33 | 0.13 | 80 | 1.07 | 0.31 |
| 4 | 123 | 1.43 | 0.12 | 78 | 1.08 | 0.33 |
| Control | 100 | 1.32 | 0.13 | 71 | 1.00 | 0.41 |

As is apparent, the 5-acetal-2-norbornene compounds of the present invention are not detrimental, sensitometrically or otherwise, when incorporated in photographic emulsions.

TABLE I

[Antibacterial Activity, μg./cc.]

| Compound: | Staph. aureus | S. typhimurium | Pseudomonas aeruginosa | Proteus vulgaris | E. coli |
|---|---|---|---|---|---|
| 1 | 1.95 | | | | |
| 2 | 1.95 | 1.95 | 0.487 | 0.487 | 62.5 |
| 3 | 1.95 | 250 | 31.25 | 62.5 | |
| 4 | 0.975 | 15.62 | 7.81 | 15.62 | 7.81 |

For purposes of clarity it is here noted that 5-[2-(1,3-dioxepanyl)]-6-methyl-2-norbornene has the formula:

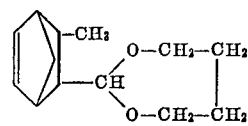

5-[2-(1,3-dioxanyl)]-6-methyl-2-norbornene has the formula:

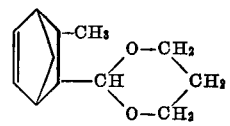

5-[2-(1,3-dioxolany)]-6-methyl-2-norbornene has the formula:

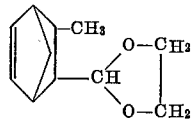

and 5-[2-(4-methoxymethyl-1,3-dioxolanyl)]-6-methyl-2-norbornene has the formula:

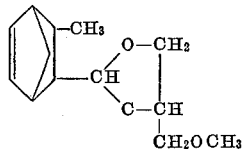

The invention has been described in considerable detail with particular reference to certain preferred embodiments thereof, but it will be understood that variations and modifications can be effected within the spirit and scope of the invention as described hereinbefore, and as defined in the appended claims.

We claim:
1. A compound of the formula:

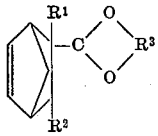

wherein $R^1$ and $R^2$ each represents hydrogen or lower alkyl and $R^3$ represents a polymethylene radical of from 2 to 4 carbons whic his unsubstituted or substituted with lower alkyl or lower alkoxyalkyl groups.

2. A compound in accordance with claim 1 wherein $R^1$ is hydrogen and $R^2$ is lower alkyl.

3. A compound in accordance with claim 1 wherein said compound is 5-[2-(1,3-dioxolanyl)]-6-methyl-2-norbornene.

4. A compound in accordance with claim 1 wherein said compound is 5-[2-(1,3-dioxanyl)]-6-methyl-2-norbornene.

5. A compound in accordance with claim 1 wherein said compound is 5-[2-(1,3-dioxepanyl)]-6-methyl-2-norbornene.

6. A compound in accordance with claim 1 wherein said compound is 5-[2-(4-methoxymethyl-1,3-dioxolanyl)]-6-methyl-2-norbornene.

References Cited

UNITED STATES PATENTS 2,421,770    6/1947    Bludworth et al. ____ 260—340.9
3,479,297   11/1969    Rutzen et al. ____ 260—340.9 X NORMA S. MILESTONE, Primary Examiner U.S. Cl. X.R.

96—94; 260—340.7, 340.9; 424—278